United States Patent
Fukuda

(10) Patent No.: US 7,249,278 B2
(45) Date of Patent: Jul. 24, 2007

(54) DISK ARRAY APPARATUS AND METHOD FOR EXPANDING STORAGE CAPACITY

(75) Inventor: Makoto Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 276 days.

(21) Appl. No.: 10/161,269

(22) Filed: May 31, 2002

(65) Prior Publication Data

US 2002/0152416 A1     Oct. 17, 2002

Related U.S. Application Data

(63) Continuation of application No. PCT/JP99/06775, filed on Dec. 2, 1999.

(51) Int. Cl.
*G06F 11/00* (2006.01)

(52) U.S. Cl. .......................... 714/7; 711/114

(58) Field of Classification Search .................... 714/6, 714/7; 711/114, 170
See application file for complete search history.

(56) References Cited

U.S. PATENT DOCUMENTS

| | | | | |
|---|---|---|---|---|
| 5,331,646 | A * | 7/1994 | Krueger et al. | 714/766 |
| 5,479,653 | A * | 12/1995 | Jones | 714/5 |
| 5,666,512 | A * | 9/1997 | Nelson et al. | 711/114 |
| 5,689,678 | A * | 11/1997 | Stallmo et al. | 711/114 |
| 5,696,934 | A * | 12/1997 | Jacobson et al. | 714/5 |
| 5,701,407 | A * | 12/1997 | Matsumoto et al. | 714/7 |
| 5,754,756 | A * | 5/1998 | Watanabe et al. | 714/6 |
| 5,758,118 | A * | 5/1998 | Choy et al. | 711/114 |
| 6,058,489 | A * | 5/2000 | Schultz et al. | 714/7 |
| 6,154,853 | A * | 11/2000 | Kedem | 714/6 |
| 6,223,301 | B1 * | 4/2001 | Santeler et al. | 714/6 |
| 6,347,359 | B1 * | 2/2002 | Smith et al. | 711/114 |
| 6,397,348 | B1 * | 5/2002 | Styczinski | 714/6 |
| 6,487,623 | B1 * | 11/2002 | Emerson et al. | 710/302 |
| 6,535,998 | B1 * | 3/2003 | Cabrera et al. | 714/15 |
| 6,587,909 | B1 * | 7/2003 | Olarig et al. | 710/302 |
| 6,684,292 | B2 * | 1/2004 | Piccirillo et al. | 711/106 |
| 6,751,136 | B2 * | 6/2004 | Hetrick et al. | 365/200 |
| 6,766,469 | B2 * | 7/2004 | Larson et al. | 714/7 |
| 7,111,147 | B1 * | 9/2006 | Strange et al. | 711/209 |
| 2002/0156891 | A1 * | 10/2002 | Ulrich et al. | 709/225 |
| 2005/0071558 | A1 * | 3/2005 | Abe et al. | 711/114 |

FOREIGN PATENT DOCUMENTS

| | | |
|---|---|---|
| JP | 62257519 | 11/1987 |
| JP | 08221216 | 8/1996 |
| JP | 09319526 | 12/1997 |
| JP | 10161817 | 6/1998 |
| JP | 10260788 | 9/1998 |
| JP | 11066692 | 3/1999 |

* cited by examiner

*Primary Examiner*—Robert Beausoliel
*Assistant Examiner*—Christopher McCarthy
(74) *Attorney, Agent, or Firm*—Greer, Burns & Crain, Ltd

(57) ABSTRACT

A disk interface controller (3) connected to a plurality of HDDS (7) is provided in the disk array apparatus. The plural HDDS 1 to 3 constitute a RAID. Three new hard disks having a larger storage capacity than that of an existing HDD are prepared. The existing HDD 1 is replaced with a new HDD 1. The data stored in the existing HDD 1 is reconstructed by the existing HDD 2 and HDD 3 to be stored in the new HDD 1. Thus, the existing HDD 2 and HDD 3 are successively replaced with new HDD 2 and HDD 3, and the data to be stored is reconstructed by the other two HDDS. After all of three HDDs are replaced with new ones, configuration information existing in each new HDD is modified to expand the storage capacity of each new HDD.

2 Claims, 17 Drawing Sheets

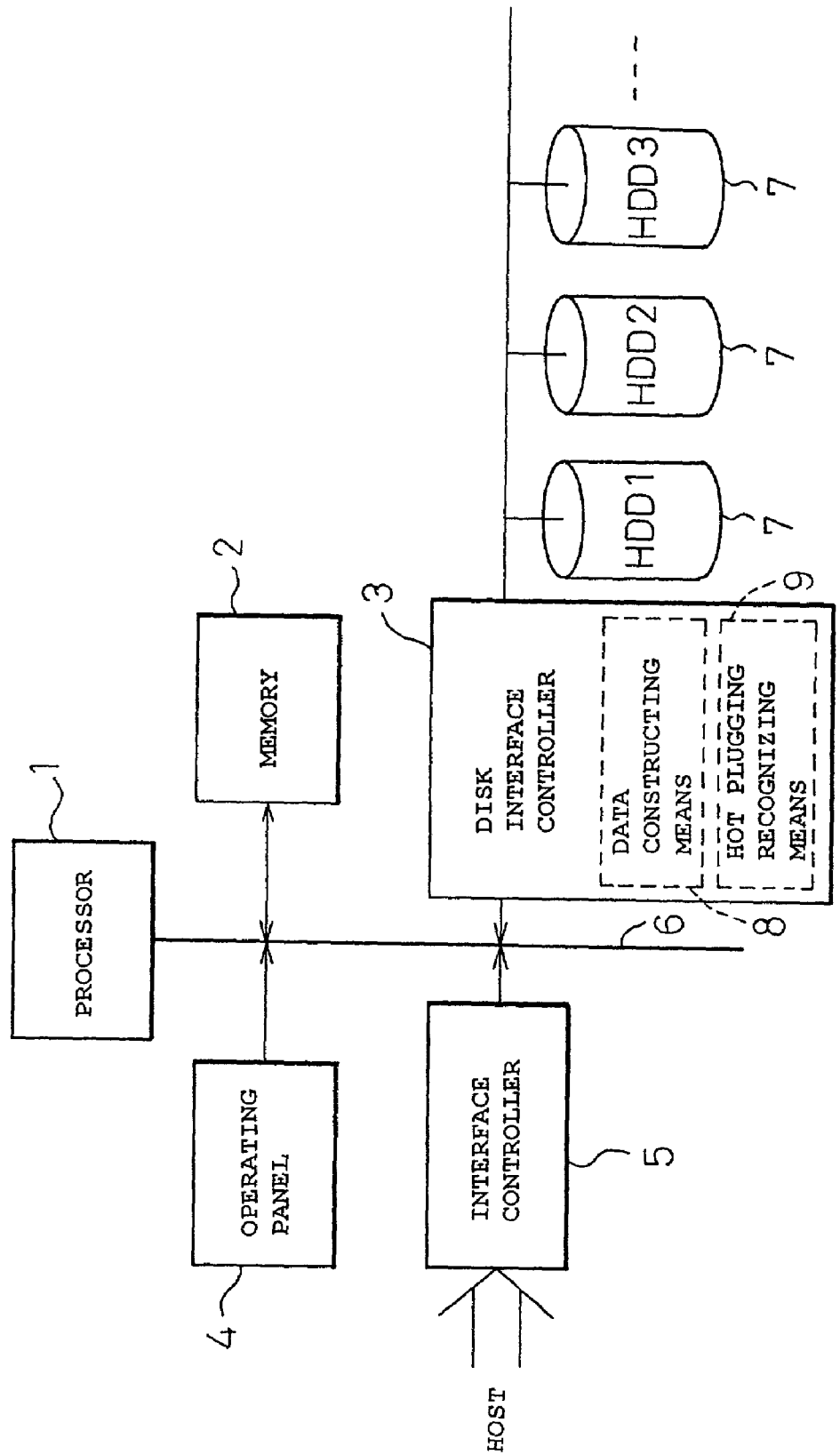

DISK ARRAY APPARATUS AND METHOD FOR EXPANDING STORAGE CAPACITY

CROSS-REFERENCE TO RELATED APPLICATION

This application is a continuation application and is based upon PCT/JP99/06775, filed on Dec. 2, 1999.

TECHNICAL FIELD OF THE INVENTION

The present invention relates to a disk array apparatus, in which the capacity of a hard disk drive (HDD) in use can be expanded, in a highly reliable disk system, with redundancy, provided with a plurality of magnetic disk drives used for a computer system, and relates to a method for expanding storage capacity.

BACKGROUND OF RELATED ART

Conventionally, a RAID (Redundant Array of Inexpensive Disks), in which a plurality of small disks are arrayed to improve the performance and the reliability of the disk system and to reduce the cost, has been used to provide a high reliable disk system.

Various configurations are proposed to realize a RAID disk array. In some of them, data stored in a single disk is fragmentized and is circularly stored in a plurality of disks. Thus, for large volume data, plural disks transfer data at one time to improve the transfer speed depending on the number of disks. For small capacity data, the data distributed to each disk is independently accessed to increase throughput. When trouble occurs, information on a defective disk which causes the trouble can be restored from the information on an effective disk by use of a redundant disk, so that the reliability can be obtained. Alternatively, the redundancy may be easily preserved by duplicating a disk.

A unit price of a small capacity disk for a unit capacity is lower than that of a high quality large capacity disk due to mass-production. Therefore, the price of the entirety of the disk array in which a plurality of small disks are arrayed can be reduced.

To realize a disk array having the above-described benefits, in which a plurality of small disks are arranged, there is a variety of RAID techniques. Other than the RAID techniques, a striping configuration can, alternatively, be used.

In the striping configuration, two or more HDDs are combined to construct an apparent large capacity drive. In RAID configurations, there are RAID 1 in which two HDDs are configured in a mirroring configuration, RAID 2 having a redundant disk for recording a Hamming code in addition to a plurality of HDDS, RAID 3 in which a parity disk for redundancy is used, RAID 4 in which the striping unit is defined by a block and RAID 5 in which data and parity information to reconstruct the data are distributed and written.

These disk array configurations will be described hereinafter in detail with reference to FIGS. 10a to 10f.

In these RAID configurations, if it is required to expand the capacity, a (n+1)-th disk is added to a RAID system of n disks, and the additional disk is incorporated in the existing RAID configuration, so that the system capacity is expanded. However, in this expanding method, if a physical factor, i.e., if a slot into which a disk is inserted is not provided, a new disk cannot be inserted into the RAID configuration. In such case, the capacity cannot be expanded. Namely, in such disk array apparatus, no expansion of capacity is possible.

Nevertheless, even in the disk array apparatus, it is sometimes required to expand the storage capacity. Therefore, in order to meet the requirement of storage capacity expansion, a new disk array apparatus having an increased capacity must be prepared. Additionally, in order to replace the disk array apparatus, an operating RAID-stored data must be once saved in a magnetic tape medium or the like, and the data must be restored from the saving medium after a new RAID configuration is constructed.

As described above, a large capacity recording apparatus such as a magnetic tape apparatus or the like is required, and not only is a process of the construction of a RAID configuration complicated but also a computer system must be stopped during reconstruction that requires long time. Thus, the operation of the computer is hindered.

DISCLOSURE OF THE INVENTION

Therefore, an important object is to expand the capacity of a disk array without adding, in advance, a slot to expand the capacity to a disk array apparatus. Additionally, there is an object in which a new RAID configuration is easily constructed when the capacity is expanded, and a downtime of a computer system, when the capacity is expanded, is reduced as much as possible.

The present invention is created in view of the above objects. The object of the present invention is to provide a disk array apparatus in which the capacity of a disk array can be easily expanded without a slot to expand the capacity provided on the disk array apparatus, and the downtime of the computer system is minimized.

According to the present invention, to archive the above objects, the disk array apparatus is provided with a controller connected to plural HDDs which constitute a RAID. A plurality of new HDDs having a larger storage capacity than that of an existing HDD are prepared. One of the existing HDDs is replaced with the new HDD, and data stored in the previous HDD is reconstructed from other HDDs and is stored in the replaced HDD. Thus, other HDDs are successively replaced with the new HDDs one by one, and data to be stored is reconstructed from other two HDDs at each replacement. After all HDDs are replaced with the new HDDS, configuration information stored in each new HDD is updated to expand the storage capacity of each new HDD. Alternatively, the controller recognizes capacities of new HDDs without any modification of HDDs, and the configuration information of the controller may be modified when the capacities of new HDDs become identical.

If one of plural HDDs is a standby disk, the standby disk is replaced with the new HDD, and data stored in one of plural HDDs is reproduced in the new HDD. The existing HDD in which data is reproduced is replaced with the new HDD, and data stored in other existing HDD is reproduced in the new HDD. After all existing HDDS are replaced with the new HDDs during reproduction of data, the configuration information stored in each new HDD is updated to expand the storage capacity of each new HDD. Alternatively, as described above, the configuration information of the controller may be modified.

Thus, the capacity of the disk array can be easily expanded without the slot to expand the capacity.

BRIEF DESCRIPTION OF THE DRAWINGS

FIG. 1 is a block diagram of a disk array apparatus according to the present invention;

EMBODIMENTS

Figure 2A:
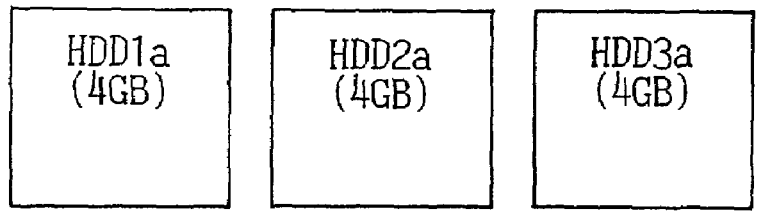
FIGS. 2a to 2f are views for schematically explaining a capacity expansion process of a disk array according to a first embodiment.

A disk array apparatus of a computer system according to a preferred embodiment of the present invention will be described with reference to FIG. 1 and FIGS. 10a to 10f.

In FIG. 1, a disk array apparatus in a computer system is schematically shown by a block diagram. The disk array apparatus contains a processor 1, a memory 2, a disk interface controller 3, an operation panel 4 and an interface controller 5 that are connected via a bus 6. Firmware or the like, including software for a storage capacity expansion process, is stored in the memory 2. A SCSI (Small Computer System Interface), IDE (Integrated Device Electronics) or the like is contained in the disk interface controller 3. A plurality of HDDs 7 (HDD 1 to 3) are connected to the disk interface controller 3. The interface controller 5 controls sending/receiving data to/from a host.

The disk interface controller 3 contains a data constructing means for constructing data to be stored in a new hard disk drive and a storage capacity modifying means for modifying the storage capacity of the hard disk drive by modifying storage capacity information of the mounted hard disk drive. The controller 3 may contain, if required, recognizing means 9 for automatically recognizing hot plugging of plural hard disk drives 7 so as to recognize hot plugging of hard disk drives during operation of the computer system.

In such a disk array apparatus, disk array configurations with redundancy composed of plural HDDs 7, such as a RAID, are shown in FIGS. 10a to 10f. Each configuration will be described below.

Figure 10A:
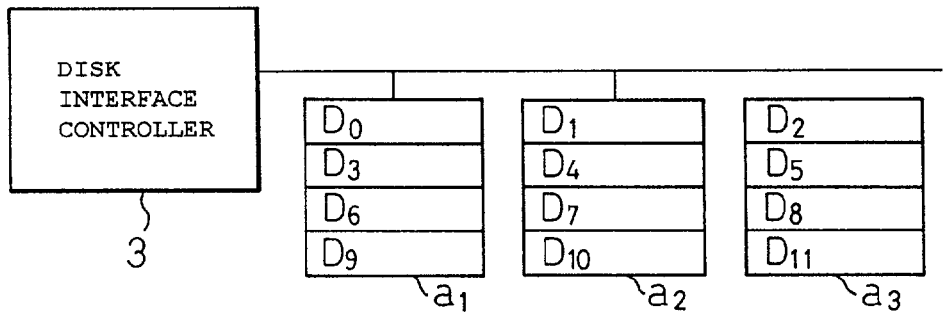
FIGS. 10a to 10f are views for schematically explaining a redundancy configuration of a disk array.

In FIG. 10a, three HDDs $a_1$ to $a_3$ are combined in a striping configuration to construct an apparent large capacity drive. The disk interface controller 3 circularly stores data $D_0$ to $D_{11}$ in three HDDs $a_1$ to $a_3$. In this configuration, data integrity cannot be expected. However, throughput can be improved because plural disk drives are used at one time.

Figure 10B:
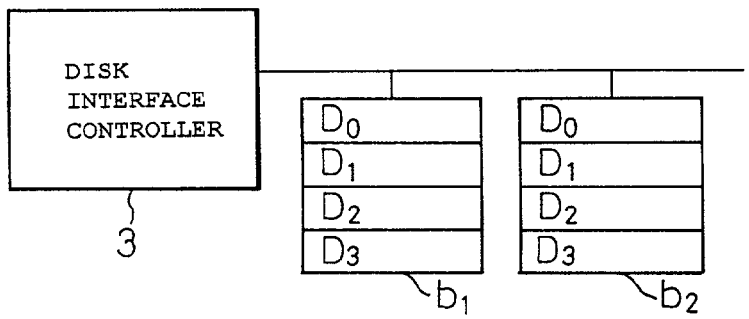

A RAID 1 configuration is shown in FIG. 10b. Completely identical data $D_0$ to $D_3$ is written in two HDDs $b_1$ and $b_2$ in a mirroring configuration to duplicate the data. Data integrity is improved.

Figure 10C:
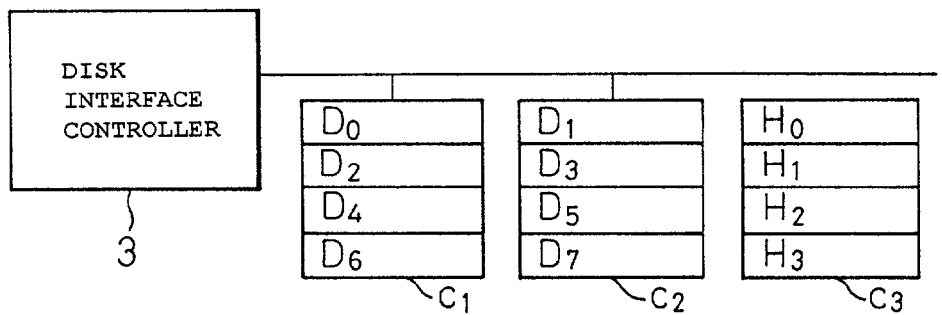

A RAID 2 configuration is shown in FIG. 10c. In this configuration, a redundancy disk HDD, in which Hamming codes $H_0$ to $H_3$ as information of distance between each data are written, is provided in addition to two HDDS. FIG. 10c shows an example in which HDD $C_3$ is the redundancy disk. The redundancy disk is assigned to any one of HDDs $c_1$ to $C_3$. A defective disk is identified by the Hamming code, and all disks are simultaneously operated, so that large capacity data access can be obtained.

Figure 10D:
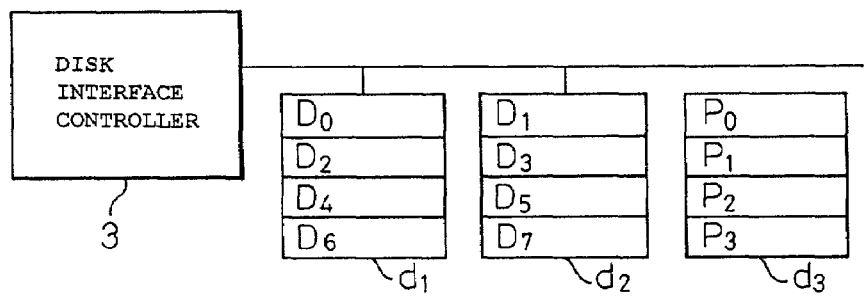

A RAID 3 configuration is shown in FIG. 10d. In this configuration, one of three HDDs $d_1$ to $d_3$ is a parity disk for redundancy. Data $D_0$ to $D_7$ is stored in HDDs $d_1$ and $d_2$. The HDD $d_3$ is a parity disk in which data and parity $P_0$ to $P_3$ to reconstruct data are stored. In this configuration, only one redundancy disk is needed regardless of the number of parallel-connected disks. This configuration has a high transfer speed and is economical.

Figure 10E:
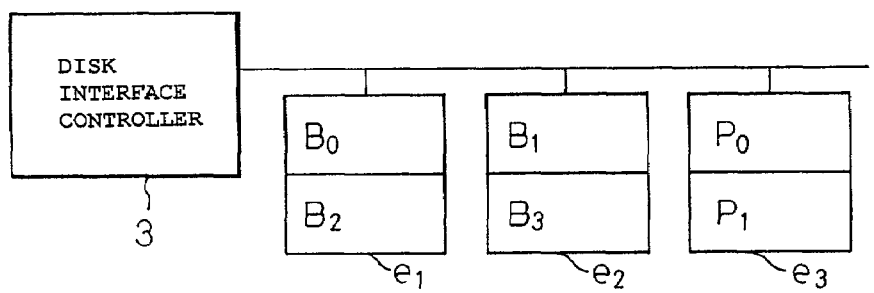

A RAID 4 configuration is shown in FIG. 10e. In this configuration, similar to RAID 3 configuration, one of three HDDs $e_1$ to $e_3$ is a parity disk HDD $e_3$ for redundancy. However, contrary to the RAID 3 configuration in which the striping process is carried out at each bit, the striping unit is defined by a block, that is the accessing unit, in the RAID 4 configuration. HDDs $e_1$ and $e_2$ are configured by data blocks $B_0$ to $B_3$, and the parity disk HDD $e_3$ is configured by parity blocks $P_0$ and $P_1$. In this configuration, each disk can be independently operated when a small capacity data is accessed.

Figure 10F:
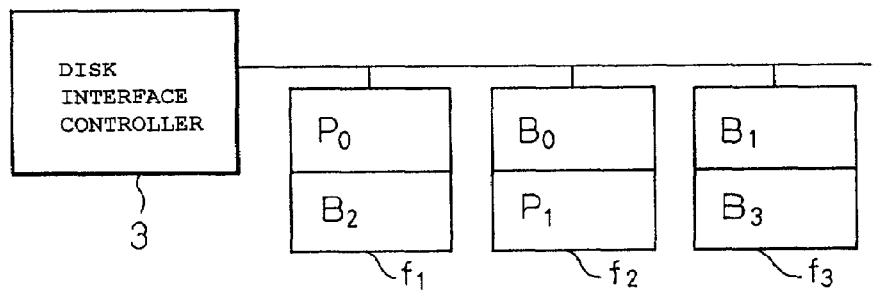

A RAID 5 configuration is shown in FIG. 10f. In this configuration, three HDDs are combined, and data and parity information to reconstruct data are distributed and written at each block. The parity block PO for data blocks $B_0$ and $B_1$ is stored in HDD $f_1$, and the parity block $P_1$ for data blocks $B_2$ and $B_3$ is stored in HDD $f_2$. In the RAID 5, a drawback of the RAID 4 that a redundancy disk for parity is needed is overcome, and safety in both speed and data can be obtained.

For the above described striping configuration and RAID configurations, three HDDs are shown in FIGS. 10a to 10f. However, the number of HDDs is not limited to three, and more than three HDDs may be combined. In order to add redundancy to the above striping configuration and RAID configurations, a standby disk may be added to the disk array.

With regard to the expansion of storage capacity in a disk array apparatus configured by a combination of plural hard disk drives as described above, preferred embodiments of the present invention will be described below. By considering whether or not a capacity expanding operation is carried out when the computer system is stopped is determined at operator's choice in view of data integrity in the operation, the embodiment of the present invention is separated into a case in which the operation is carried out when the computer is stopped and a case in which the operation is carried out when the computer system is operating. Moreover, the two cases are further separated into a case in which only a RAID configuration is provided and a case in which the standby disk is added to the RAID configuration. Therefore, four embodiments will be described below.

In a first embodiment, in the disk array apparatus configured as the RAID, a hard disk drive is replaced with a large capacity one when the computer system is stopped.

In a second embodiment, in the disk array apparatus configured as the RAID, a hard disk drive is replaced with a large capacity one when the computer system is operated.

In a third embodiment, in the disk array apparatus configured as the RAID to which the standby disk is added, a hard disk drive is replaced with a large capacity one when the computer system is stopped.

In a fourth embodiment, in the disk array apparatus configured as the RAID to which the standby disk is added, a hard disk drive is replaced with a large capacity one when the computer system is operated.

First Embodiment

In the computer system in which plural HDDs of the disk array apparatus are used for the RAID configuration, if, for example, only three HDDS can be physically equipped, an HDD cannot be added to increase the storage capacity of a RAID system because three disk drives are already mounted.

The capacity expansion will be described with reference to, for example, the RAID 5 configuration in which three HDDs are equipped.

A procedure of expansion of the storage capacity in the disk array apparatus configured as the RAID by plural HDDs 7 (HDD 1 to 3) will be described with reference to FIGS. 2a to 2f in which HDDs are schematically shown.

As shown in FIG. 2a, in the first embodiment, the RAID 5 is configured by the HDDs 1a to 3a. In this case, a capacity equal to the capacity of one HDD is occupied by parity. Therefore, if each of the HDDs 1a to 3a has the capacity of 4 GB, the total storage capacity of this RAID configuration amounts to the capacity of two HDDs, i.e., 8 GB.

Only three disk slots are prepared in this RAID configuration. Therefore, in order to expand the storage capacity, the HDD having the storage capacity of 4 GB is replaced with a new HDD having the storage capacity of 9 GB to expand the capacity of the RAID configuration to 18 GB in total storage capacity. In other words, as the capacity equal to one of three 9 GB HDDs is assigned to parity, the total storage capacity is 18 GB.

Figure 2B:
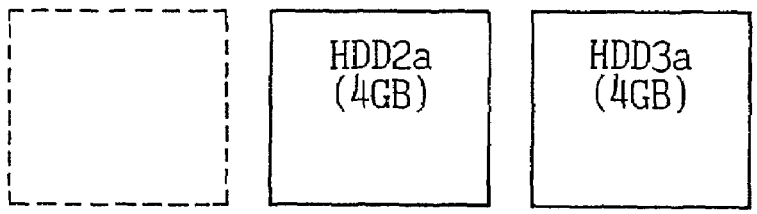

In the first embodiment, when the existing HDD is replaced with the new HDD, the replacement is carried out when the computer system is stopped in view of data integrity. In order to replace the existing HDD with the new HDD, any one of three HDDs that constitute RAID is isolated. In FIG. 2b, the existing HDD 1a is isolated, and a state in which HDD 1a is withdrawn from the slot is shown by a phantom line. In this case, the isolation is carried out on the HDD 1a. However, the isolation may be carried out on another HDD. One HDD is isolated, so that the RAID configuration becomes non-redundancy. This state is called a "critical state".

The concurrent withdrawal of two HDDs from the equipped plural HDDs is prohibited. This disturbs the RAID configuration, and makes the reconstruction of data impossible.

A new HDD 1b of 9 GB is inserted into the vacant slot, so that the HDD 1a is replaced with the HDD 1b. Data stored in the HDD 1a is lost due to the withdrawal of the HDD 1a. Therefore, the data stored in the HDD 1a is reconstructed based on the data stored in a HDD 2a and a HDD 3a after replacement with the HDD 1b.

With regard to a newly inserted HDD, a method in which a logical capacity is modified to 4 GB and a method in which the logical capacity remains 9 GB can be taken into account.

For example, the method in which the logical capacity is modified to 4 GB will be described below.

The reconstruction of data will be described. Parity $P_0$, data $B_0$ and data $B_1$ are stored in the striping of the HDD 1a, HDD 2a and HDD 3a, respectively, so that the RAID 5 is configured. The HDD 1a is isolated from the RAID configuration and is replaced with the HDD 1b, and the data is reconstructed by use of a data constructing means 8. At the beginning, there is a relation, $f(P_0, B_0)=B1$. Therefore, the inverse function $g(B_1, B_0)=P_0$ is used so that parity $P_0$ lost due to the isolation of the HDD 1a is replaced with parity $P_0$ to be stored in the HDD 1b. Thus, the data can be reconstructed based on the data $B_0$ and the data $B_1$.

Figure 2C:
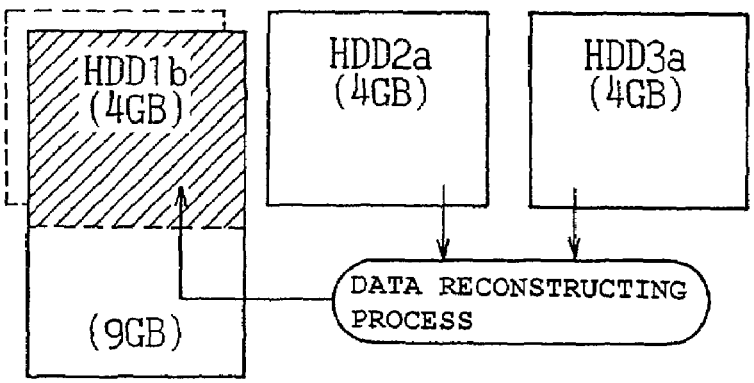

The state of reconstruction in HDD 1b is shown by oblique lines in FIG. 2c. When the reconstruction in the HDD 1b is carried out, the storage capacity of the HDD 1b is treated as 4 GB. The remaining 5 GB is shown by a blank in the drawing.

Figure 2D:
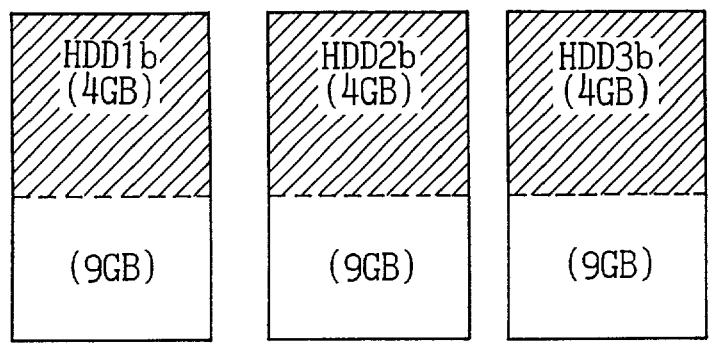

Similarly, the HDD 2a is replaced with the HDD 2b of 9 GB. Data of the HDD 2a is reconstructed from the HDD 3a and the reconstructed HDD 1b. In addition, the HDD 3a is replaced with the HDD 3b of 9 GB. Data of the HDD 3a is reconstructed from the reconstructed HDD 1b and the HDD 3a. As shown in FIG. 2d, all of the 4 GB HDDs 1a to 3a are replaced with 9 GB HDDs, and the former data is reconstructed as shown by oblique lined portions in the drawing.

In the step shown in FIG. 2d, all of three HDDs are replaced with 9 GB HDDs. However, the logical storage capacity remains 4 GB. In each HDD, configuration information to show the logical capacity of the HDD is recorded in accordance with the storage capacity to be used, and is normally recorded in the end area of the HDD.

Figure 2E:
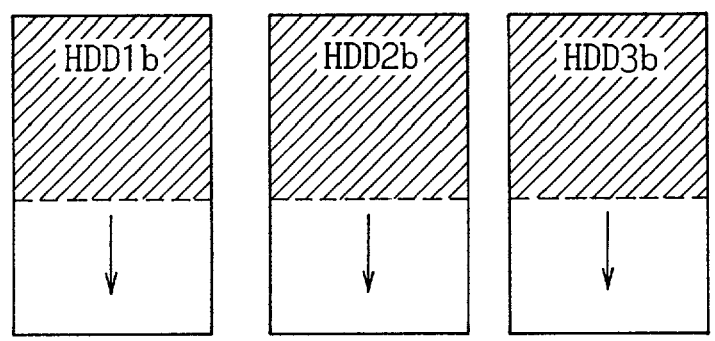

Therefore, when the data is reconstructed, the configuration information stored in the HDD that constitutes the RAID recognizes the logical storage capacity as 4 GB. Accordingly, in this point in time, as shown in FIGS. 2d and 2e, the configuration information exists in the middle area of the replaced HDDs 1b to 3b, and 9 GB HDDs are treated as 4 GB HDDs. If the storage capacity of the HDDs 1b to 3b remains 4 GB, the capacity is not expanded. Therefore, the configuration information of each HDD is updated to an actual capacity, i.e., 9 GB, by use of a storage capacity modifying means of a disk interface controller 3, and the capacity of each HDD recorded in the configuration information is modified from 4 GB to 9 GB, so that continuous free space of 9 GB is reserved from the head area of the HDD (see FIG. 2e).

Figure 2F:
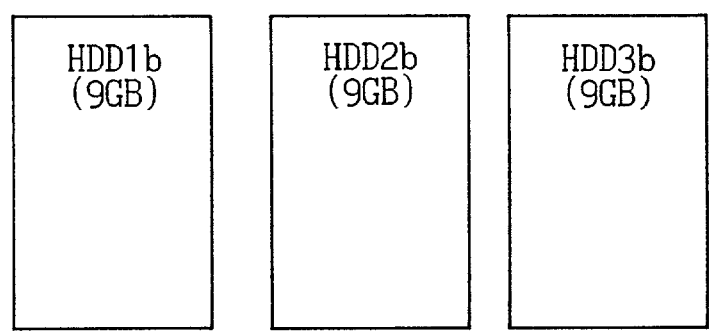

The configuration information of each HDD is modified, so that new RAID 5 is configured by three 9 GB HDDs 1b to 3b, as shown in FIG. 2f. Thus, the total storage capacity of the entire RAID is expanded from 8 GB to 18 GB. However, when the storage capacity is expanded in only the HDD side, the existing capacity is still recognized as 8 GB in an OS side. Control information of a logical drive of the RAID is modified so that a new capacity is recognized as 18 GB.

The state of the configuration information is selected as required, for example, if the storage capacity of three HDDs 1b to 3b is set at 6 GB, the total storage capacity of the RAID configuration can be expanded from 8 GB to 12 GB.

Finally, after the control information of the OS for the RAID in question is modified, the computer system is rebooted to complete the capacity expansion.

A RAID 5 is described above. Similarly, the storage capacity can be expanded even in the other RAID configurations 1 to 4.

Figure 3:
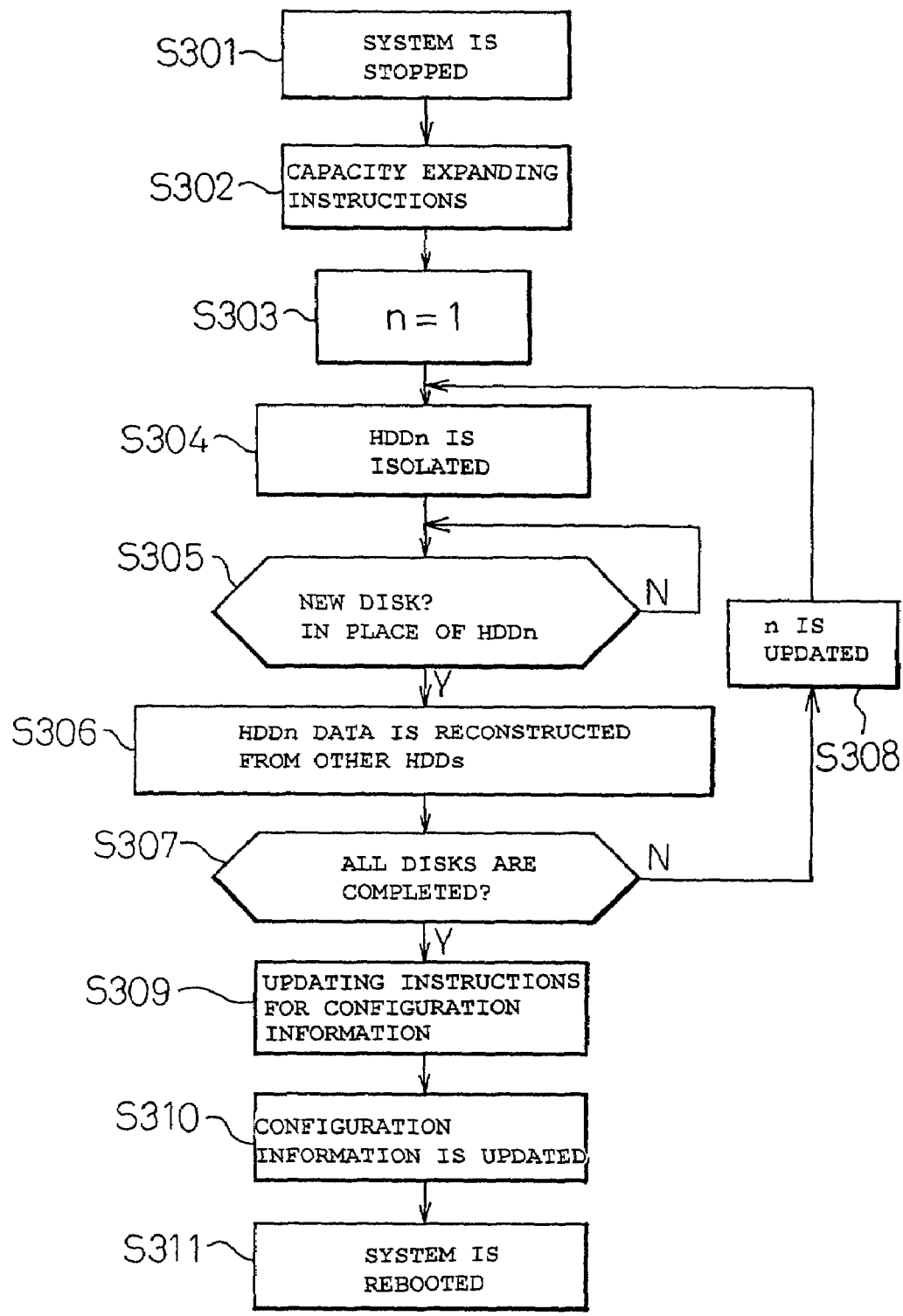
FIG. 3 is a flowchart to explain a capacity expansion process according to a first embodiment.

The expansion of storage capacity shown in FIGS. 2a to 2f in the disk array apparatus provided with plural hard disk drives 7 configured as the RAID will be described with reference to a flowchart in FIG. 3.

The RAID 5 is configured by three HDDs 1a to 3a in the disk array apparatus. The HDDs 1a to 3a are replaced with new HDDs 1b to 3b having a large capacity. The computer system is stopped (S301).

Instructions for expanding the storage capacity of the HDDs 1a to 3a are given form the operation panel 4 (S302). Thus, the expansion is started by the firmware stored in the memory 2.

The HDD is successively replaced with a new HDD from the HDD 1a. The HDD number n is set at 1 (S303).

If the n is set at 1, the HDD 1a is isolated from the RAID configuration by the disk interface controller 3 (S304).

The HDD 1a is isolated from the RAID configuration, so that the mounted HDD 1a can be withdrawn, and new HDD 1b is mounted in place of the HDD 1a (S305). The system is on standby until the new HDD 1b is mounted (N).

When the new HDD is mounted (Y), data stored in the HDD 1a is reconstructed in the HDD 1b by the HDD 2a and the HDD 3a (S306).

Whether or not the existing HDD has been replaced with a new HDD is judged for all disks (S307).

If there is any HDD that is not replaced (N), the HDD number n is updated (S308), the step is returned to the step S304, the remaining HDD, for example, the HDD 2a is replaced with the HDD 2b, and the above-described operation is repeated until the replacement of all disks is completed.

If the replacement of all disks is completed (Y), instructions for updating the configuration information in the replaced HDDS 1b to 3b are given by the storage capacity modifying means of the disk interface controller 3 (S309), the configuration information in the HDDs 1b to 3b is modified to reserve a continuous free space from the head area to the end area (S310).

After the configuration information of the HDDs 1b to 3b is updated, the newly expanded storage capacity is registered and modified in a control table. The system is rebooted so that the expansion is recognized in the OS (S311).

If the capacity is expanded when the logical capacity of the newly inserted HDD is kept at 9 GB, a function to adjust the amount of using HDD depending on the HDD having a smallest capacity among the inserted HDDs is provided in the controller. Thus, if a new 9 GB HDD is inserted, the capacity of 4 GB is used, and the remaining capacity remains blank, i.e., an unused capacity.

When the replacement of all HDDS is completed, the configuration information of the controller is modified to 9 GB.

As described above, according to the first embodiment, the existing HDD is successively replaced with the new HDD having a largely expanded storage capacity, and the data is reconstructed at every replacement. Therefore, even if the slot for expansion is not prepared, the RAID configuration having the total storage capacity of 8 GB can be expanded to the RAID configuration having the total storage capacity of 18 GB, with the integrity of data already stored in the RAID, without use of other recording medium. Because it is not required that the data is temporality saved in other recording medium and the data is reconstructed thereafter, the downtime of the computer system can be reduced, and the storage capacity is easily expanded.

Second Embodiment

When the existing HDD is replaced with the new HDD, whether or not the computer system is stopped is selected by an operator's choice. In the first embodiment, the procedure of expansion of the storage capacity of the HDD is carried out during stop of the computer system. In a second embodiment, the replacement of the HDD is carried out during operation of the computer system. Therefore, in the second embodiment, as a hardware function of the RAID system, a disk hot plugging function is provided. Accordingly, the storage capacity of the RAID configuration can be expanded during operation of the system, and the downtime of the computer system is further reduced.

The disk array apparatus according to the second embodiment is configured as a block configuration similar to the disk array apparatus used in the first embodiment. However, the disk array apparatus according to the second embodiment is different from the disk array apparatus used in the first embodiment in a way that a means for automatically recognizing hot plugging of the hard disk drive is provided in the disk interface controller 3, and the system is set to automatically shift the status of one disk to an isolated state (a dead state) when the HDD is withdrawn.

A procedure of expansion of the storage capacity in the second embodiment will be described with reference to FIGS. 4a to 4f that are schematically shown.

Figure 4A:
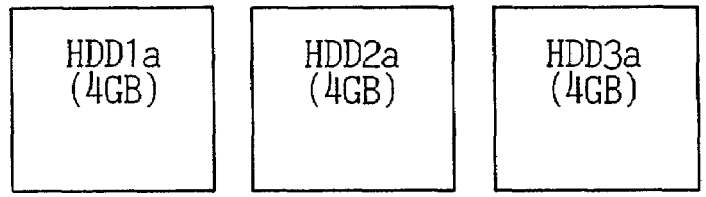
FIGS. 4a to 4f are views for schematically explaining a capacity expansion process of a disk array according to a second embodiment.

As shown in FIG. 4a, similar to the first embodiment, the RAID configuration in the second embodiment is composed of the HDDs 1a to 3a each having the capacity of 4 GB. The total storage capacity of this RAID configuration is 8 GB.

Only three disk slots are prepared in this RAID configuration. Therefore, in order to expand the storage capacity, the existing HDD is replaced with a new HDD having the storage capacity of 9 GB expanded from 4 GB to expand the capacity of the RAID configuration to 18 GB in total storage capacity.

In the first embodiment as described above, the computer system is initially stopped to replace the existing HDD with the new HDD. In the second embodiment, the hot plugging recognizing means of the hard disk drive is provided, and the system is set to shift the status of one disk to an isolation state (a dead state) when the HDD is withdrawn. Therefore, in this embodiment, the computer system is not stopped. The replacement is carried out during operation of the system.

Figure 4B:
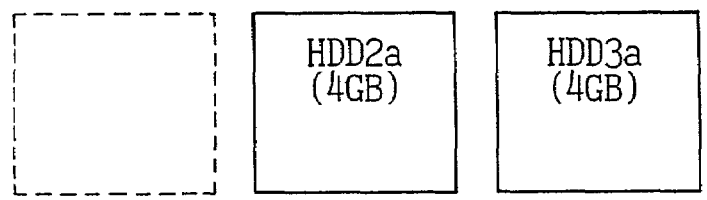

Any of three HDDs that constitute the RAID is isolated. In FIG. 4b, the state in which the existing HDD 1a is isolated and withdrawn is shown by a phantom line. In this time, since there is a shortage of one HDD, the RAID configuration is in a critical state.

The new 9 GB HDD 1b is inserted in a vacant slot to replace the HDD 1a with HDD 1b. Data stored in the HDD 1a is lost due to the withdrawal of the HDD 1a. Accordingly, after the replacement with HDD 1b, the data stored in the HDD 1a is reconstructed based on data stored in the HDD 2a and the HDD 3a, in a background process, by use of a data constructing means 8.

With regard to the newly inserted HDD, there are a method in which the logical capacity is modified to 4 GB and a method in which the logical capacity remains 9 GB. Similar to the first embodiment, the method in which the logical capacity is modified to 4 GB will now be described.

Figure 4C:
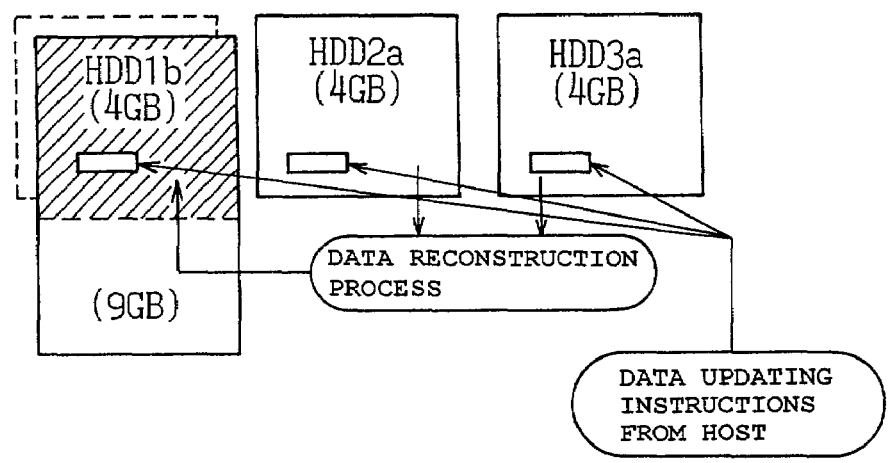

This state is shown in FIG. 4c. This is similar to FIG. 2c of the first embodiment. However, in the second embodiment, the replacement is carried out during operation of the system. Therefore, contrary to FIG. 2c of the first embodiment, instructions for updating RAID recording data may be given from the host during expansion of the storage capacity. In this case, an access for updating was previously processed to update data stored in the RAID including the HDD 1b that is being reconstructed.

For example, when updating instructions are given, the writing of the updating data in a predetermined storing position of the HDD 1b, the HDD 2a and the HDD 3a is given higher priority than the reconstruction of the HDD 1b, even during the reconstruction. When the storing position is not yet reconstructed, the updating data is initially written in the position. After that, the storing position including the updating data can be reconstructed.

Figure 4D:
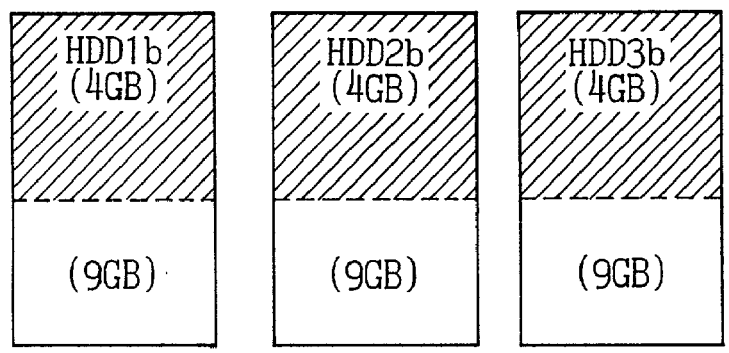

Similarly, as shown in FIG. 4d, the HDD 2a and the HDD 3a are replaced with the 9 GB HDD 2b and the 9 GB HDD 3b. As shown in oblique lined portions in the drawing, former data is reconstructed.

In the step shown in FIG. 4d, all of three HDDs are replaced with 9 GB HDDs. However, the logical storage capacity remains 4 GB. Therefore, configuration information stored in the replaced HDD must be updated to 9 GB. In the update of the configuration information, since it is necessary to initialize the RAID system, the system must be temporarily stopped.

Figure 4E:
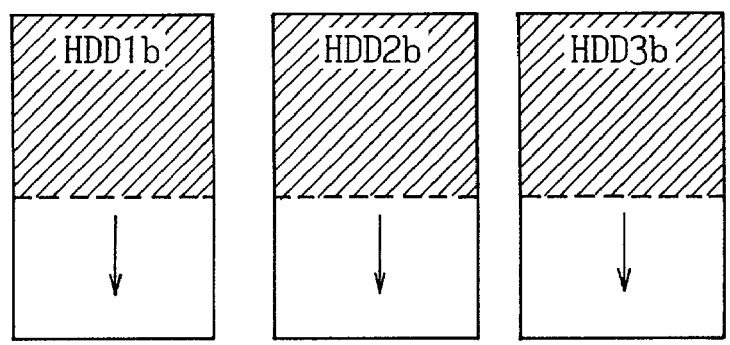
Figure 4F:
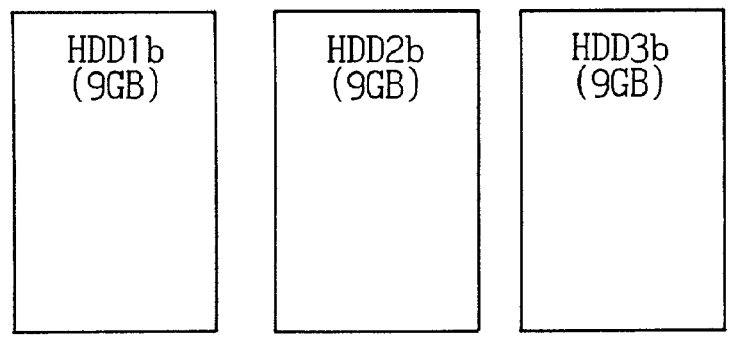

The completion of configuring new RAID configuration having an expanded capacity that is composed of the HDDs 1b to 3b, by updating the configuration information and by use of the storage capacity modifying means of the disk interface controller 3, after the system is stopped, is shown in FIGS. 4e and 4f. Since FIGS. 4e and 4f are similar to FIGS. 2e and 2f of the first embodiment, the description thereof is omitted.

In the procedure of the second embodiment described above, a case in which data updating instructions are given from the host is shown in the step shown in FIG. 4c. The data updating instructions from the host are given priority at any time, if before the system is stopped.

Figure 5:
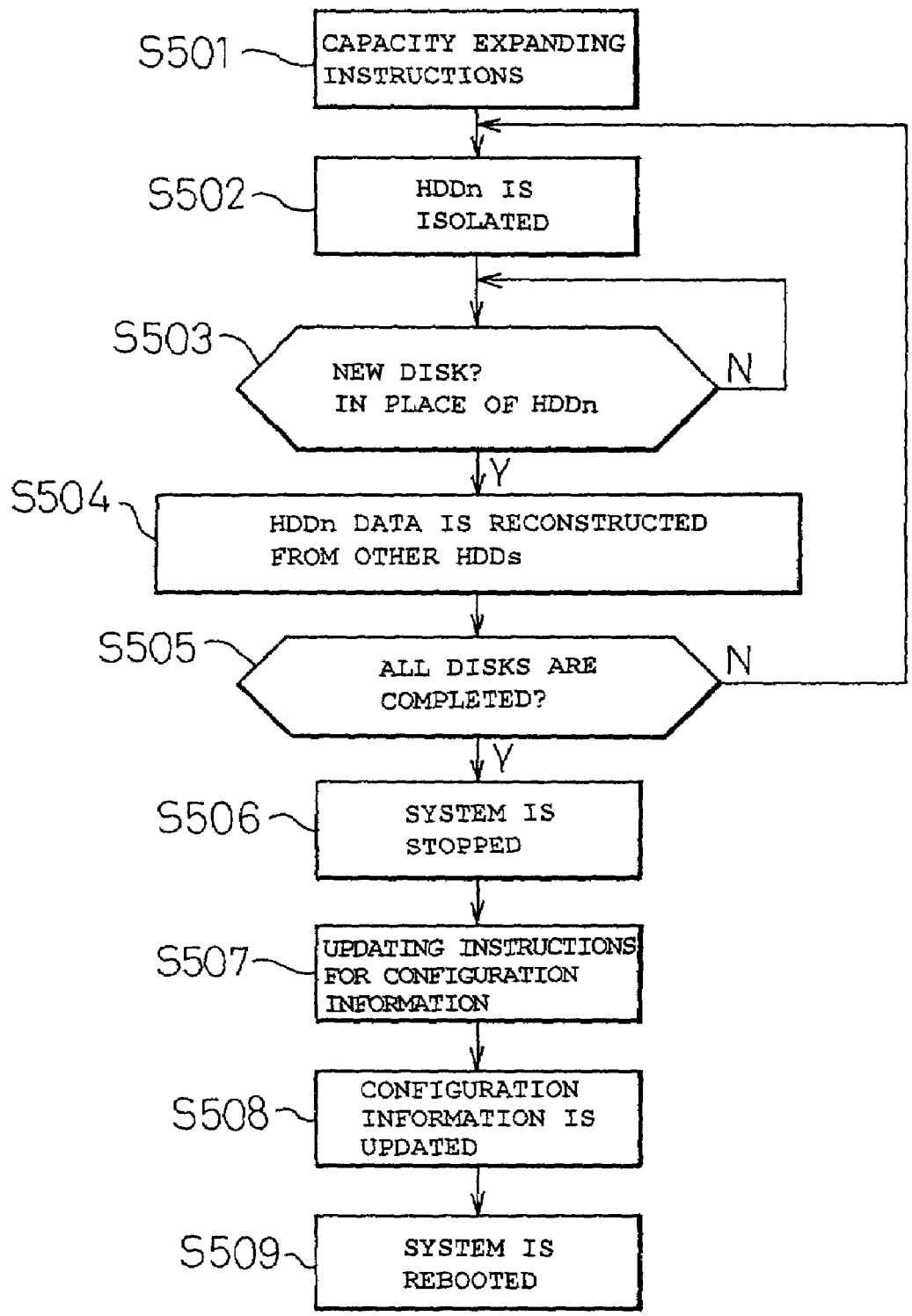
FIG. 5 is a flowchart to explain a capacity expansion process of a disk array according to a second embodiment.

The expansion of the storage capacity shown in FIGS. 4a to 4f in the disk array apparatus provided with plural hard disk drives 7 configured as the RAID will be described with reference to a flowchart in FIG. 5.

Instructions for expanding the storage capacity of the HDDs 1a to 3a are given from the operation panel 4 during operation of the system (S501). Thus, the expansion is started by the firmware stored in the memory 2.

When the mounted HDD na is withdrawn, the HDD number n is recognized by the disk interface controller 3. The HDD na corresponding to the recognized HDD number is isolated from the RAID configuration (S502). In FIG. 4b, since the HDD 1a is withdrawn, the HDD number n is set at 1.

The new HDD 1b is mounted in place of the withdrawn HDD 1a (S503). If the new HDD 1b is not mounted (N), the system is on standby until the new HDD 1b is mounted.

When the new HDD is mounted (Y), data stored in the HDD 1a is reconstructed in the HDD 1b by the HDD 2a and the HDD 3a (S504). In this time, if data updating instructions are given from the host, the writing of updating data is given priority even during reconstruction.

Whether or not the existing HDD is replaced with the new HDD is judged for all disks (S505).

If there is any HDD that is not replaced (N), the step is returned to the step S502, the remaining HDD, for example, the HDD 2a is replaced with the HDD 2b, and the above-described operation is repeated until the replacement of all disks is completed.

If the replacement of all disks is completed (Y), the system is temporarily stopped to initialize the replaced HDDs 1b to 3b (S506).

In order to modify the configuration information in the HDDs 1b to 3b, the continuous free space from the head area to the end area of the HDDs is provided (S507, S508). After the management information in a file system is modified, the system is rebooted (S509).

As described above, according to the second embodiment, in addition to the effect of the first embodiment, the RAID configuration having the total storage capacity of 8 GB can be expanded to the RAID configuration having the total storage capacity of 18 GB even during operation of the system. Therefore, the downtime of the computer system when the storage capacity is expanded can be minimized.

In the second embodiment, the logical capacity of the new HDD is modified to 4 GB. However, the replacement can be carried out when the logical capacity of the new HDD remains 9 GB. In this case, the capacity of 4 GB is used, and the remaining capacity is treated as an unused capacity, during the replacement. When all HDDs are replaced, the configuration information of the controller can be updated to 9 GB. In this time, it is not required to stop the system because only the configuration information of the controller is modified.

Third Embodiment

In the above-described first and second embodiment, the RAID 5 is configured by three HDDs having the storage capacity of 4 GB. In the RAID configuration having the total storage capacity of 8 GB, the HDDs are replaced with new three 9 GB HDDs, and the RAID configuration is expanded to the RAID configuration having the total storage capacity of 18 GB. This is a case in which only three HDDs that constitute the RAID configuration can be equipped.

Contrary to this, in a third embodiment, is shown a case in which four HDDs that constitute the RAID can be physically equipped, and the HDDs are replaced when the computer system is stopped. In the four HDDS, three HDDs having the storage capacity of 4 GB constitute the RAID 5, and one HDD is used as the standby disk. The storage capacity of the RAID system cannot be expanded by adding another HDD even in the third embodiment.

Therefore, in the third embodiment, the RAID configuration having the total storage capacity of 8 GB is expanded to the RAID configuration having the total storage capacity of 18 GB by replacing the old drives with new four 9 GB HDDS, without adding another HDD.

Similar to the first embodiment, there are a method in which the logical capacity of the newly inserted HDD is modified to 4 GB and a case in which the logical capacity remains 9 GB. The former will be described.

The disk array apparatus according to the third embodiment is configured as a block configuration similar to the disk array apparatus used in the first embodiment. However, a HDD 0 is additionally connected to the disk interface controller 3 in addition to the HDDs 1 to 3. The HDD 0 is used as the standby disk. The disk array apparatus according to the third embodiment is different from the disk array apparatus used in the first embodiment in a way that the controller 3 is set to automatically successively reproduce the status of one disk when the disk is withdrawn.

The expansion of the capacity in the RAID 5 configuration of four HDDs having the standby disk will be described with reference to FIGS. 6a to 6g that are schematically shown.

Figure 6A:
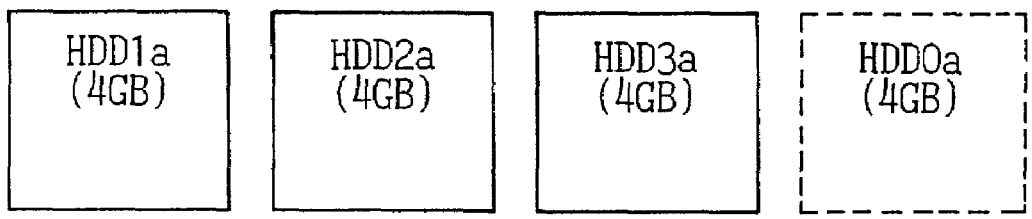
FIGS. 6a to 6g are views for schematically explaining a capacity expansion process of a disk array according to a third embodiment.

As shown in FIG. 6a, the RAID configuration according to the third embodiment is composed of the HDDs 1a to 3a each having the capacity of 4 GB. The total storage capacity of this RAID configuration is 8 GB. The HDD 0 is equipped as the standby disk.

Only four disk slots are prepared in this RAID configuration. Therefore, in order to expand the storage capacity, the existing HDD is replaced with a new HDD having the storage capacity of 9 GB expanded from 4 GB to expand the capacity of RAID configuration to 18 GB in total storage capacity.

In the third embodiment, the computer system is initially stopped to replace the existing HDDs with the new HDDs. If any of three HDDs that constitute the RAID is isolated, the RAID configuration is brought into a critical state. Therefore, the HDD to be initially replaced is the standby disk.

Figure 6B:
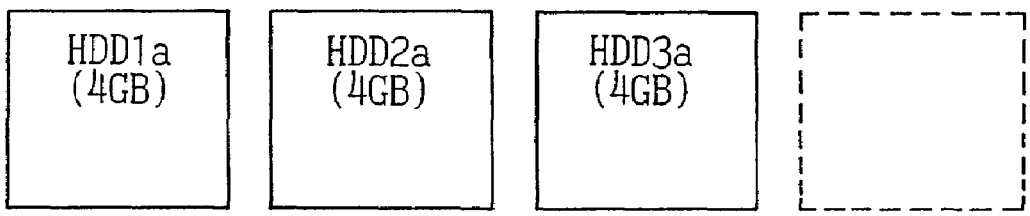

In FIG. 6b, a state in which the existing standby disk is isolated and withdrawn is shown by a phantom line.

Figure 6C:
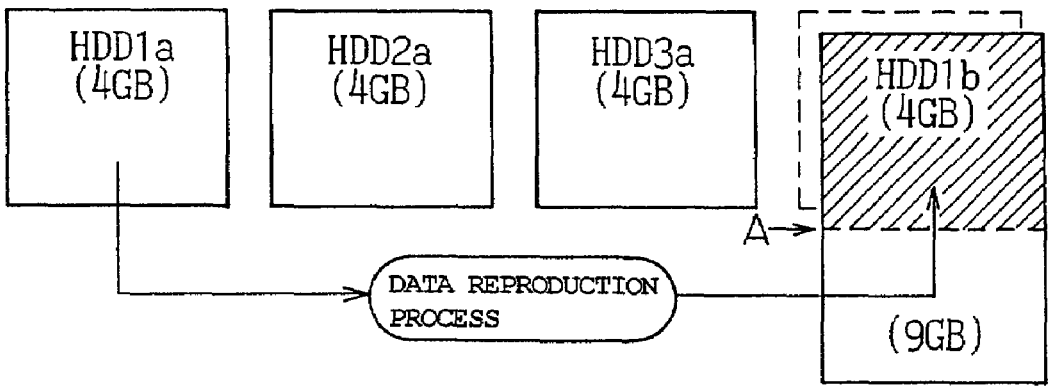

The new 9 GB HDD 1b is inserted in the vacant slot to replace the standby disk with the HDD 1b. As shown in FIG. 6c, data stored in the HDD 1a is reproduced in the HDD 1b by use of the data constructing means 8. In this state, the RAID configuration is maintained.

Figure 6D:
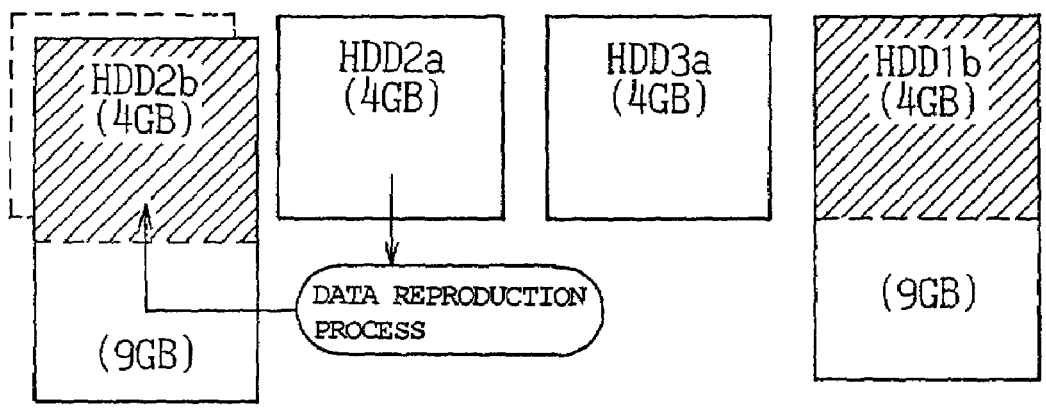

The HDD 1a is withdrawn, the new 9 GB HDD 2b is inserted in the slot, and data stored in the HDD 2a is reproduced in the HDD 2b. In this time, as shown in FIG. 6d, the RAID configuration is constructed by the HDD 2a, the HDD 3a and the HDD 1b, and the redundancy is maintained. Therefore, the RAID system is not brought into the critical state.

If two HDDs are withdrawn by accident at one time, or if any problem occurs in other HDDs during replacement of HDD, the RAID system is brought into the critical state. However, the data can be preserved.

Figure 6E:
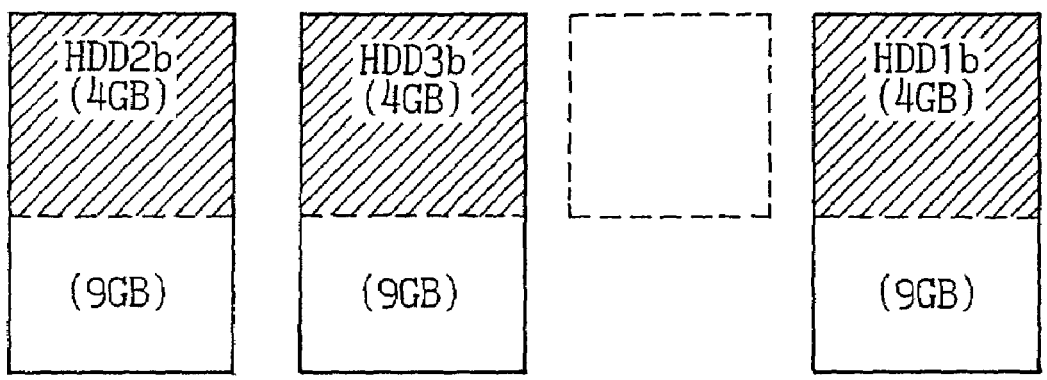
Figure 6F:
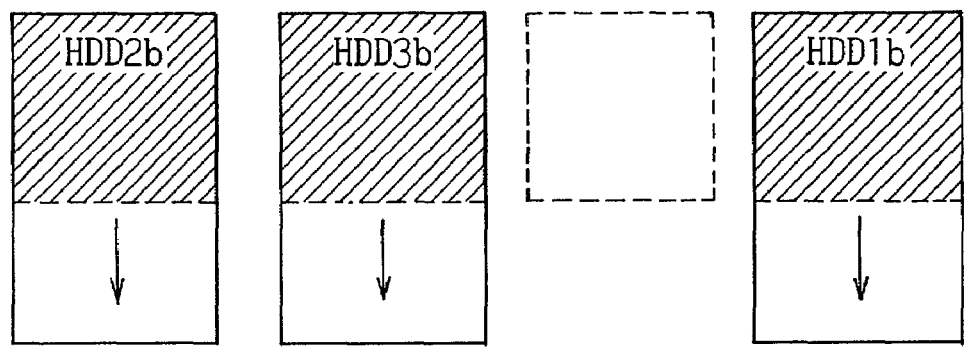

After data of the HDD 2 is reproduced in the HDD 2b, the HDD 2a is withdrawn, and the HDD 3b is inserted thereafter. Data of the HDD 3a is reproduced in the HDD 3b. Thus, as shown in FIG. 6e, after all data of the HDDs 1a to 3a is reproduced in the HDDs 1b to 3b, the HDD 3a is withdrawn. Since the data is reproduced, it is not required to reconstruct data for the RAID configuration.

At this point in time, the configuration information stored in the HDDs that constitute the RAID exists in the middle area of the replaced HDDs. The configuration information of each HDD is updated by the storage capacity modifying means of the disk interface controller 3, so that the capacity of each HDD recorded in the configuration information is modified from 4 GB to 9 GB. Thus, a continuous free space of 9 GB is reserved from the head area of the HDD (see FIG. 6f).

Figure 6G:
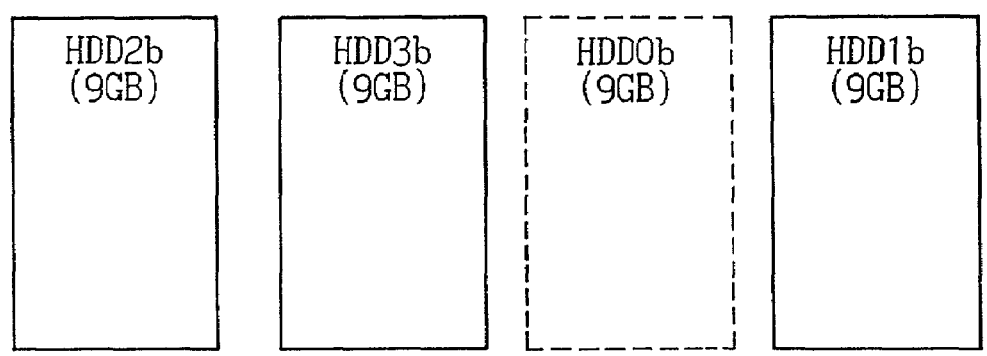

As shown in FIG. 6g, after the configuration information of each HDD is modified, the HDD 0b is inserted to the slot from which the HDD 3a is withdrawn. The RAID 5 is configured by three 9 GB HDDs 1b to 3b. The HDD 0b is defined as the standby disk. The management information of the logical drive of the RAID is modified for the management table of the file system. After that, the system is rebooted.

The RAID 5 is described above. Similarly, the storage capacity can be expanded even in other RAID configurations 0 to 4.

The expansion of the storage capacity shown in FIGS. 6a to 6g in the disk array apparatus provided with plural hard disk drives 7 configured as the RAID, including the standby disk, will be described with reference to a flowchart in FIG. 7.

The computer system is stopped (S701).

Instructions for expanding the storage capacity of HDDs are given form the operation panel 4 (S702). Thus, the expansion is started by the firmware stored in the memory 2.

The HDD number n is set at 1 by the disk interface controller 3 (S703).

If the HDD number n is set, instructions for withdrawing the HDD (n−1)a are given. Accordingly, if the n is set at 1, the HDD 0 as the standby disk is withdrawn. Thus, the HDD 0a is withdrawn (S704).

Whether or not the HDD nb is mounted in place of the HDD (n−1)a after the HDD (n−1)a is withdrawn is judged (S705). In this case, since the HDD 0a is withdrawn, the HDD 1b is mounted. The system is on standby until the new HDD 1b is mounted (N).

If the HDD 1b is mounted (Y), as shown in FIG. 6c, data stored in the HDD 1a is reproduced in the HDD 1b (S706)

When the data of the HDD na is reproduced, the HDD na is replaced with the new HDD nb. Whether or not the reproduction of data is completed for all HDDs is judged (S707). If the reproduction is not completed (N), the HDD number n is updated (S708), and the step is returned to the step S704. If the number n is updated to 2, as shown in FIG. 6d, the HDD 1a is withdrawn, new HDD 2b is mounted, and the data of the HDD 2a is reproduced in the HDD 2b.

If all disks are replaced (Y), instructions for updating the configuration information in the replaced HDDs 1b to 3b are given from the storage capacity modifying means of the disk interface controller 3 (S709). The configuration information in the middle area of the HDDs 1b to 3b is updated, and the continuous free space is reserved from the head area to the end area of the HDDs (S710).

After the configuration information of the HDDS 1b to 3b is updated, the newly expanded storage capacity is registered and modified in the management table. The system is rebooted so that the expansion is recognized in the OS (S711).

As described above, according to the third embodiment, the inheritance of data stored in the existing RAID system is carried out by not reconstructing but reproducing data. The computing process for data reconstruction is not necessary, and the processing time can be reduced. It is not required that the status of the RAID is shifted to the critical state. Therefore, the redundancy of the RAID provided with the standby disk can be effectively maintained during expanding operation. Thus, the data integrity can be improved.

Fourth Embodiment

In a fourth embodiment, four HDDs that constitute the RAID can be physically equipped, and one of the four HDDS is the standby disk. Similar to the third embodiment, the RAID configuration having the total storage capacity of 8 GB is expanded to the RAID configuration having the total storage capacity of 18 GB by replacing with new four 9 GB HDD, without adding another HDD. In the forth embodiment, a disk hot plugging function as a hardware function of the RAID system is provided. Accordingly, the storage capacity of the RAID configuration can be expanded even during operation of the system.

In the fourth embodiment, similar to the second embodiment, there are a method in which the logical capacity of the newly inserted HDD is modified to 4 GB and a case in which the logical capacity remains 9 GB. The former will be described.

The disk array apparatus according to the fourth embodiment is configured as a block configuration similar to the disk array apparatus used in the third embodiment. However, the disk array apparatus according to the forth embodiment is different from the disk array apparatus used in the third embodiment in a way that a means for automatically recognizing hot plugging of the hard disk drive is provided in the disk interface controller 3 so as to provide the disk hot plugging function as the hardware function of the RAID system.

A procedure of expansion of the storage capacity in the fourth embodiment is schematically shown in FIGS. 8*a* to 8*g*. This expansion procedure is similar to the expansion procedure shown in FIGS. 6*a* to 6*g* according to the third embodiment, however, is different from the expansion procedure in the third embodiment in a way that the expanding operation can be carried out even during operation of the system because the disk hot plugging function as the hardware function of the RAID system is provided. Therefore, in the fourth embodiment, it is necessary to stop the system only when the RAID system is initialized.

Figure 8A:
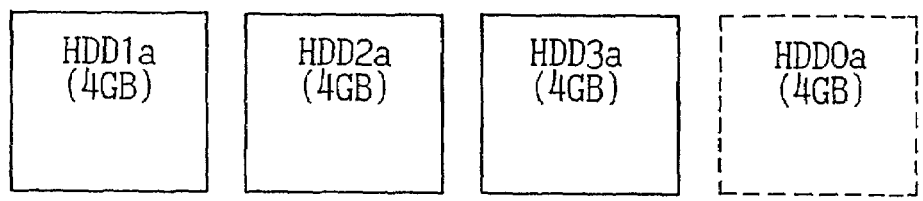
FIGS. 8a to 8g are views for schematically explaining a capacity expansion process of a disk array according to a forth embodiment.
Figure 8B:
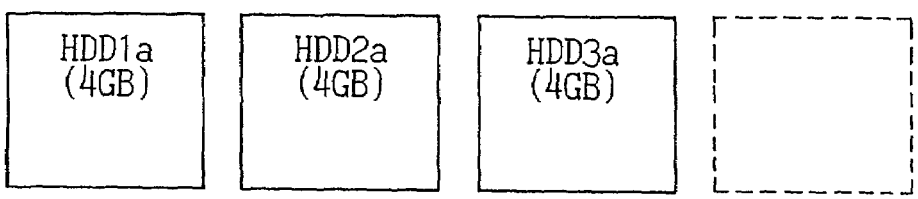
Figure 8C:
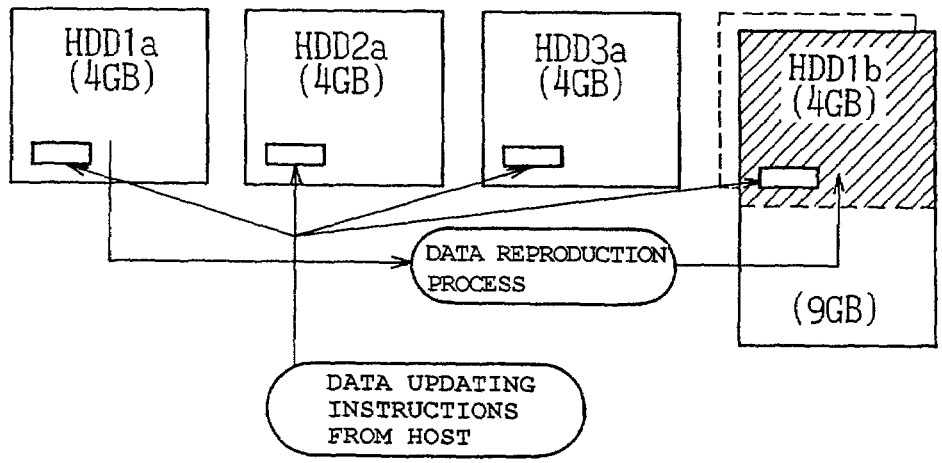
Figure 8D:
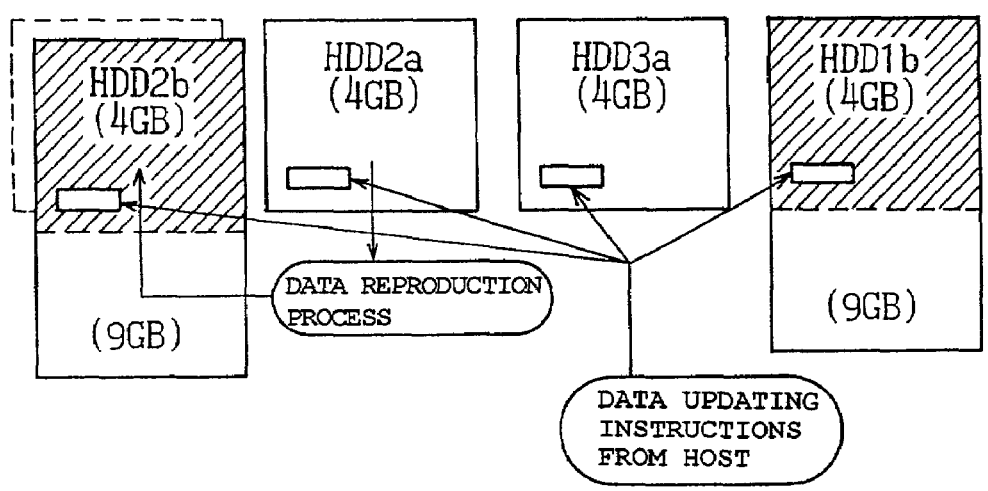
Figure 8E:
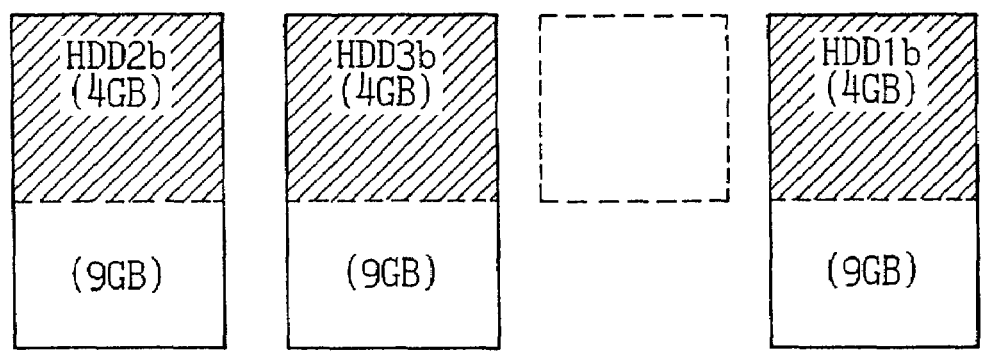
Figure 8F:
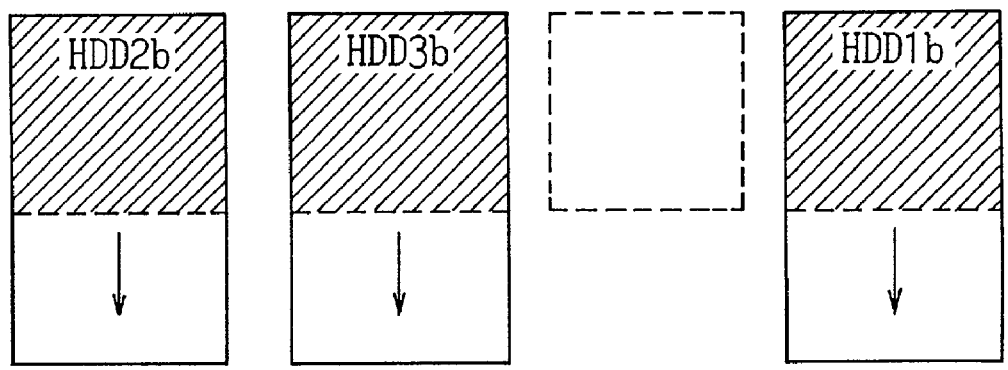
Figure 8G:
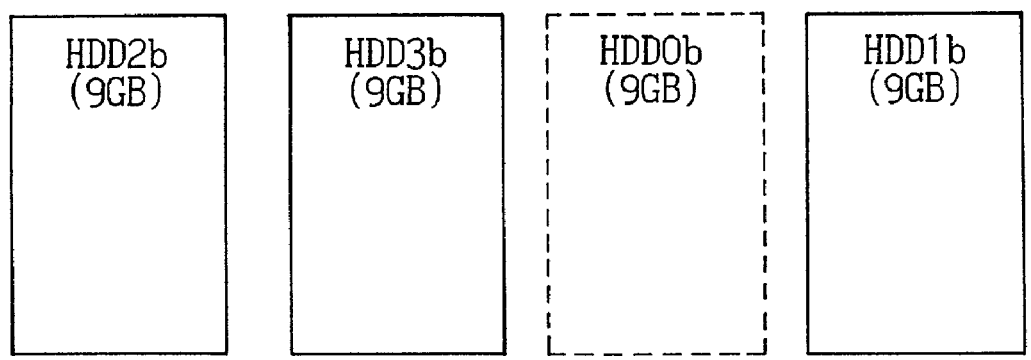

As shown in FIGS. 8*c* and 8*d*, instructions for updating data may be given from the host to carry out the expansion of the capacity during operation of the system. In this case, the access for updating is priorly processed to write data into all four HDDs including the HDD that is being reconstructed.

Similar to the second embodiment, when the data updating instructions are given from the host, the data updating from the host can be given priority at any time, if before the system is stopped.

Figure 7:
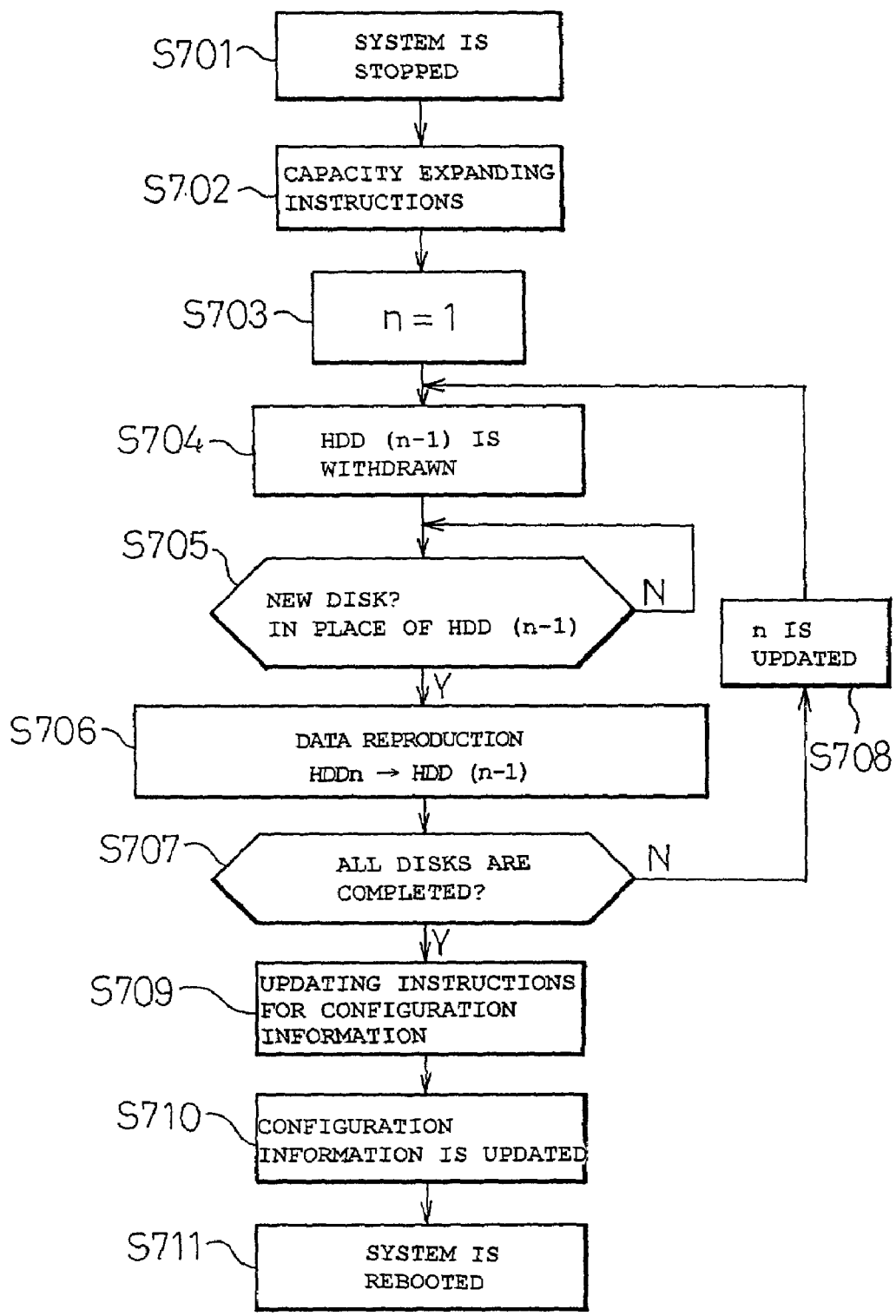
FIG. 7 is a flowchart to explain a capacity expansion process of a disk array according to a third embodiment.

A flowchart of the expansion of storage capacity shown in FIGS. 8*a* to 8*g* in the disk array apparatus provided with plural hard disk drives 7 configured as the RAID, including the standby disk, is shown in FIG. 7.

Figure 9:
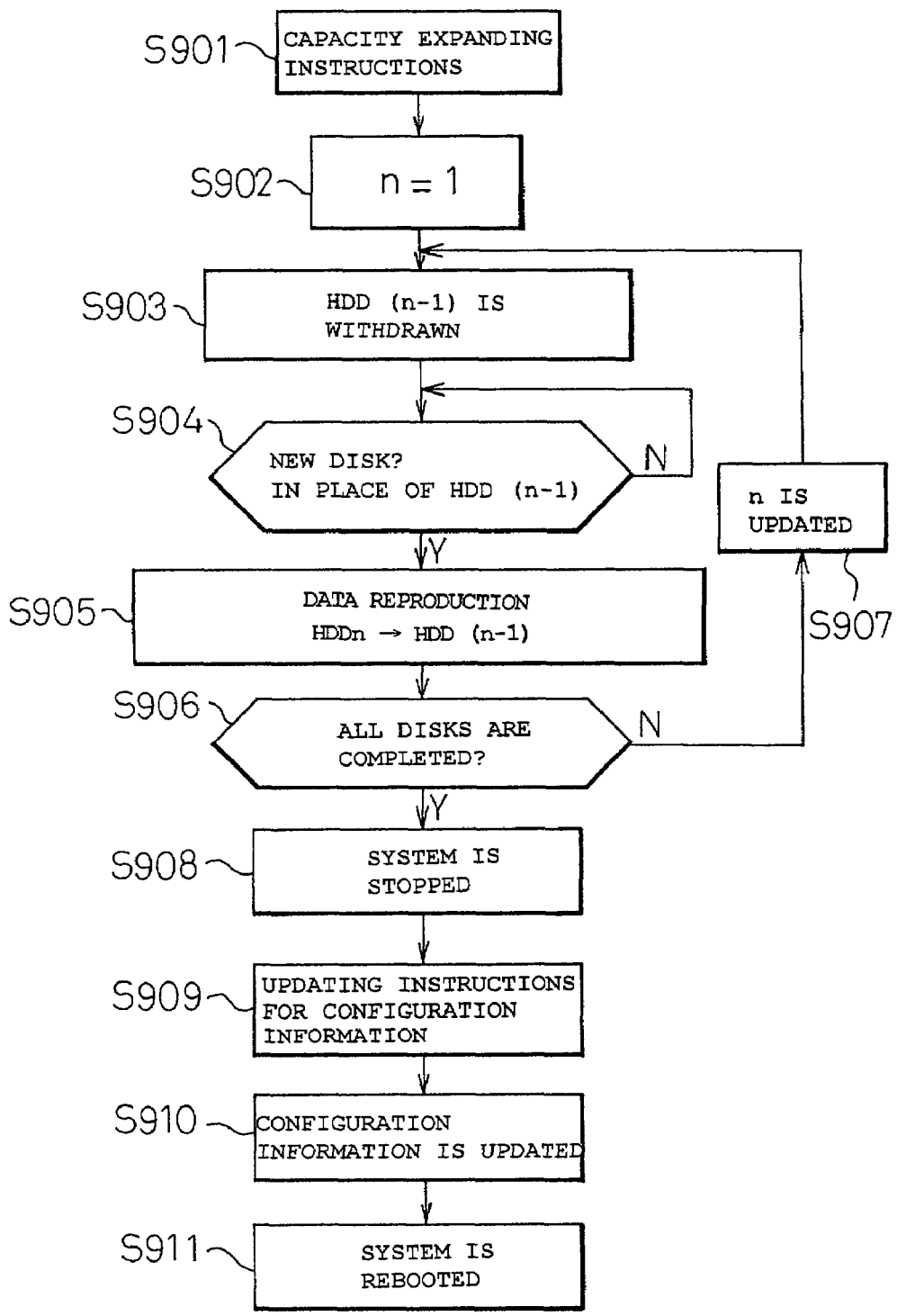
FIG. 9 is a flowchart to explain a capacity expansion process of a disk array according to a forth embodiment.

The expanding procedure from the step S901 to the step S906 is similar to the expanding procedure from the step S702 to the step S707, according to the third embodiment, shown in FIG. 7. In the expanding procedure of the fourth embodiment shown in FIG. 9, the disk hot plugging function is provided to carry out the expansion even during operation of the system. Therefore, the computer system is stopped in the step S908 after all disks are replaced with new HDDs and all storage data is reproduced, contrary to the third embodiment in FIG. 7, in which the computer system is stopped in the step S701.

The expansion process from the step S909 to the step S911 is similar to the expansion process from the step S709 to the step S711.

As described above, according to the fourth embodiment, the disk hot plugging function is provided in addition to the effect according to the third embodiment. Therefore, the expansion of the capacity can be carried out even during operation of the system. Thus, the time for expansion can be reduced without reducing the operation time of the system.

As described above, according to the present invention, when the storage capacity of plural HDDS configured as the RAID is expanded, even if the HDD cannot be physically added, the storage capacity of the disk array configured as the RAID can be expanded by replacing old HDDs with new HDDs having a larger capacity. Additionally, the downtime of the computer system can be minimized.

The invention claimed is:

1. A method for expanding a storage capacity of a disk array configured by a plurality of hard disk drives including a standby disk, comprising the steps of:
    replacing the standby disk with a new hard disk drive having a larger storage capacity, and copying data stored in one of the hard disk drives to be replaced, to a new hard disk drive having a larger storage capacity;
    replacing the hard disk drive with a new hard disk drive having a larger storage capacity, and copying data stored in one of the remaining hard disk drives to be replaced, to a new hard disk drive having a larger storage capacity;
    repeating steps of replacing and copying until all of the hard disk drives are successively replaced by the new hard disk drives; and
    modifying the configuration information of each of the hard disk drives after the data is stored in all of the new hard disk drives configured as a RAID.

2. A method for expanding a storage capacity of a disk array according to claim 1, wherein when data updating is requested for the new hard disk drive, updating of data is given priority in the writing of data.

* * * * *